United States Patent [19]
Nagati

[11] 4,168,824
[45] Sep. 25, 1979

[54] ENCLOSURE FOR METALLURGICAL VESSELS

[75] Inventor: Rashed N. Nagati, Mars, Pa.

[73] Assignee: Pennsylvania Engineering Corporation, Pittsburgh, Pa.

[21] Appl. No.: 854,313

[22] Filed: Nov. 23, 1977

Related U.S. Application Data

[63] Continuation-in-part of Ser. No. 847,681, Nov. 2, 1977, abandoned.

[51] Int. Cl.² .............................................. C21C 5/38
[52] U.S. Cl. ........................................ 266/158; 75/60
[58] Field of Search ........................... 75/60; 122/7 A; 110/180; 266/142, 143, 158

[56] References Cited

U.S. PATENT DOCUMENTS

| | | | |
|---|---|---|---|
| 2,855,194 | 10/1958 | Konig | 266/158 |
| 3,168,073 | 2/1965 | Durham et al. | 122/7 A |
| 3,215,425 | 11/1965 | Vogt | 266/158 |
| 3,367,644 | 2/1968 | Ban | 266/179 |
| 3,972,708 | 8/1976 | Baum | 75/60 |
| 4,049,246 | 9/1977 | Ziegler | 266/142 |

FOREIGN PATENT DOCUMENTS 2155537   3/1971   Fed. Rep. of Germany ........... 266/142

*Primary Examiner*—Gerald A. Dost

[57] ABSTRACT

An open-topped vessel for converting molten ferrous metal to steel is pivotal about a horizontal axis and has bottom tuyeres for blowing oxygen or other gases upwardly through molten metal. An enclosure at least partially surrounds the vessel and cooperates with a smoke hood to prevent the escape of pollutants when the vessel is in its vertical position. A pair of access doors are provided for closing an opening provided in the enclosure laterally of the vessel tilt axis and are mounted for movement in opposite directions. An auxiliary smoke hood is mounted in the enclosure above the opening for capturing pollutants when the vessel is tilted toward said opening for being charged. The inner surface of the doors are formed of a plurality of tubular members which extend generally vertically and are connected to inlet and outlet headers at their opposite ends. The doors may be provided with a removable section in the region most directly impacted by materials discharging from the vessel when the vessel is tilted. The edges of the doors are provided with a sealing structure and one or both of the doors may be provided with a small operature for sampling.

15 Claims, 17 Drawing Figures

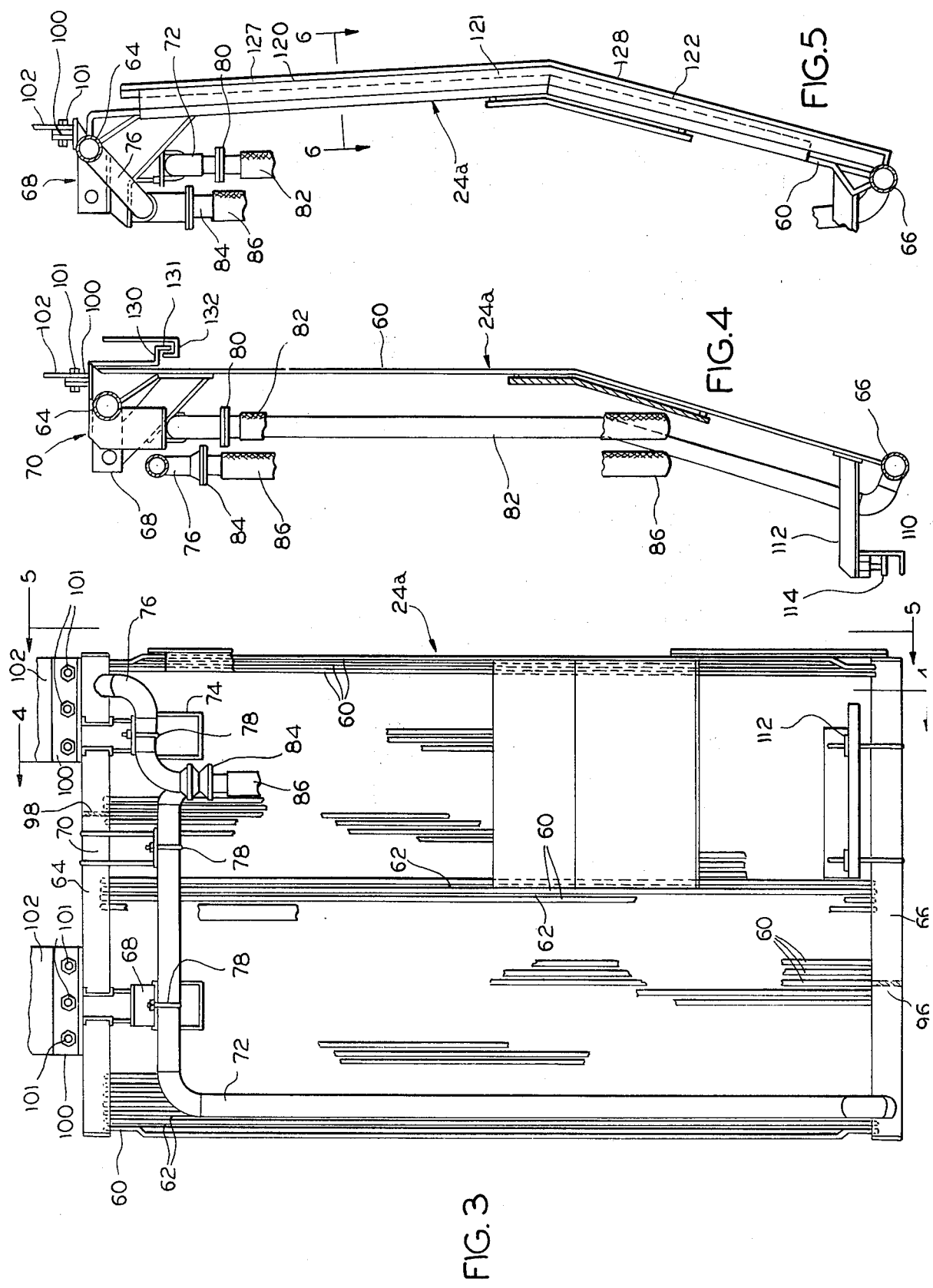

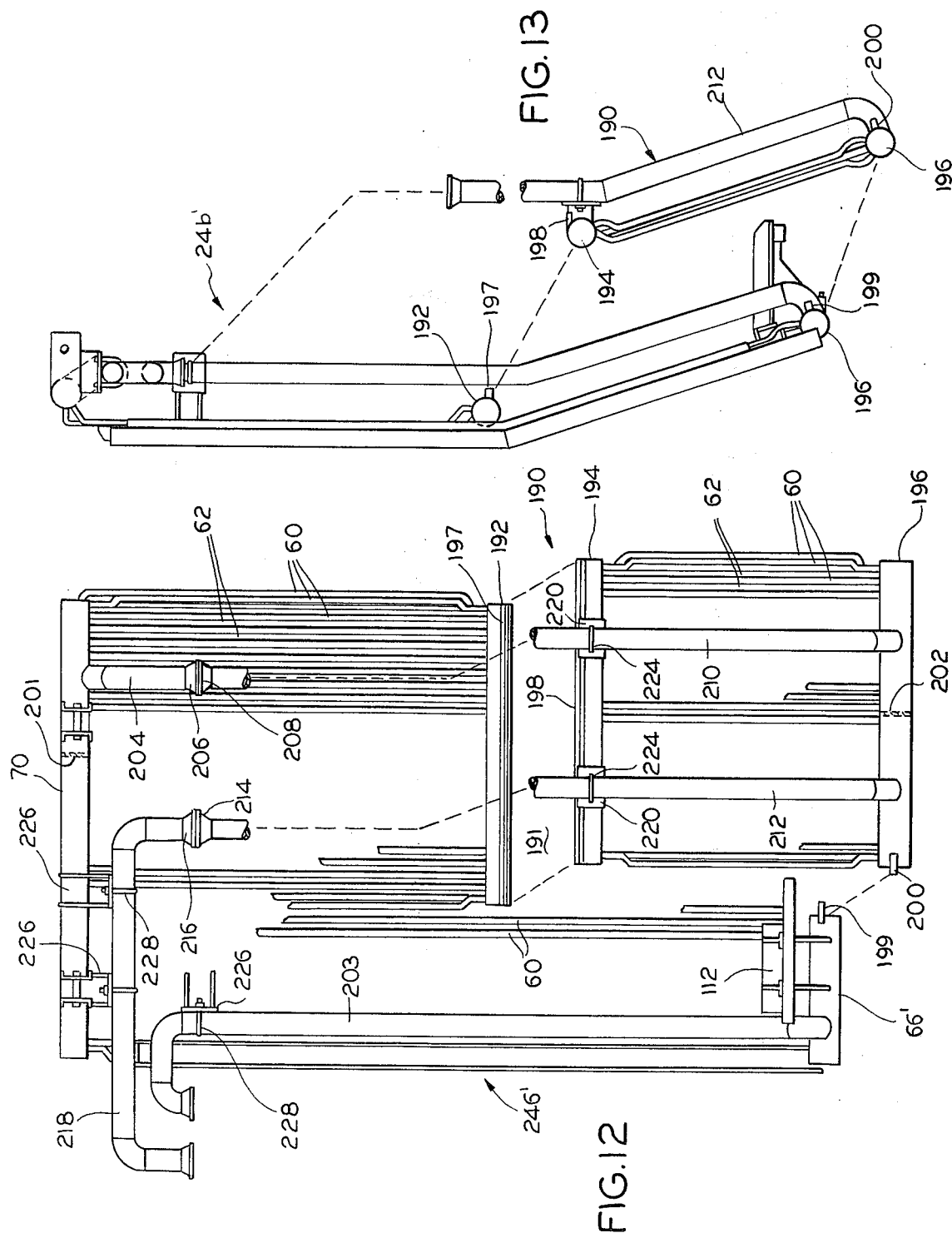

ENCLOSURE FOR METALLURGICAL VESSELS

This is a continuation-in-part of application Ser. No. 847,681, filed Nov. 2, 1977, now abandoned.

BACKGROUND OF THE INVENTION

This invention relates to enclosures for steel conversion apparatus.

One type of steel conversion apparatus includes an open-topped vessel having tuyeres extending through its lower end for injecting oxygen beneath the level of moten metal within the vessel. In addition, a hydrocarbon shielding fluid, such as light oil, natural gas, or propane, is injected in surrounding relation to the oxygen for prolonged tuyere life. As a result of the reactions within the vessel and the disassociation of the shielding fluid, pollutant gases and particulate material are discharged from the open upper end of the vessel. In order to prevent the discharge of these pollutants, such vessels are often provided with a smoke hood coupled to a gas cleaning system. Such smoke hoods are normally disposed above the open upper end of the vessel and are incapable of completely collecting off-gases when the vessel is tilted for charging with hot metal or scrap, sampling, tapping, or deslagging. Accordingly, an enclosure may be provided around the vessel for preventing discharge of pollutants during such operations. An access door in one side of the enclosure may be opened and closed for periodic charging. When it becomes necessary in the performance of certain portions of the process cycle to pivot the vessel, the vessel's open mouth is often directed toward the access doors with the result that radiant heat from the vessel and the discharge of molten metal, slag, and hot gases from the vessel mouth impose an excessive heat load on the enclosure doors.

SUMMARY OF THE INVENTION

A general object of the invention is to provide a new and improved enclosure door for the enclosures of steel conversion vessels.

A further object of the invention is to provide a new and improved access door for steel converter enclosures which is protected against excessive heating when the vessel is turned down.

A further object of the invention is to provide an access door for steel converter enclosures which is sealed against the flow of gases into and out of the enclosure.

Another object of the invention is to provide an access door for molten metal enclosures wherein portions of the doors most likely to be damaged by material discharging from the vessels may be replaced rapidly.

Yet another object of the invention is to provide an access door for converter enclosures which permits sampling without opening the doors.

These and other objects and advantages of the invention will become more apparent from the detailed description thereof taken with the accompanying drawings.

BRIEF DESCRIPTION OF THE DRAWINGS

FIG. 3 is a front elevational view of one of the access doors employed with the enclosure of FIG. 2;

FIG. 4 is a view taken along lines 4—4 of FIG. 3;

FIG. 5 is a view taken along lines 5—5 of FIG. 3;

FIG. 12 shows a front elevational view of an alternate embodiment of the door assembly;

FIG. 13 is a side elevational view of the door illustrated in FIG. 12;

DESCRIPTION OF THE PREFERRED EMBODIMENT

Figure 1:
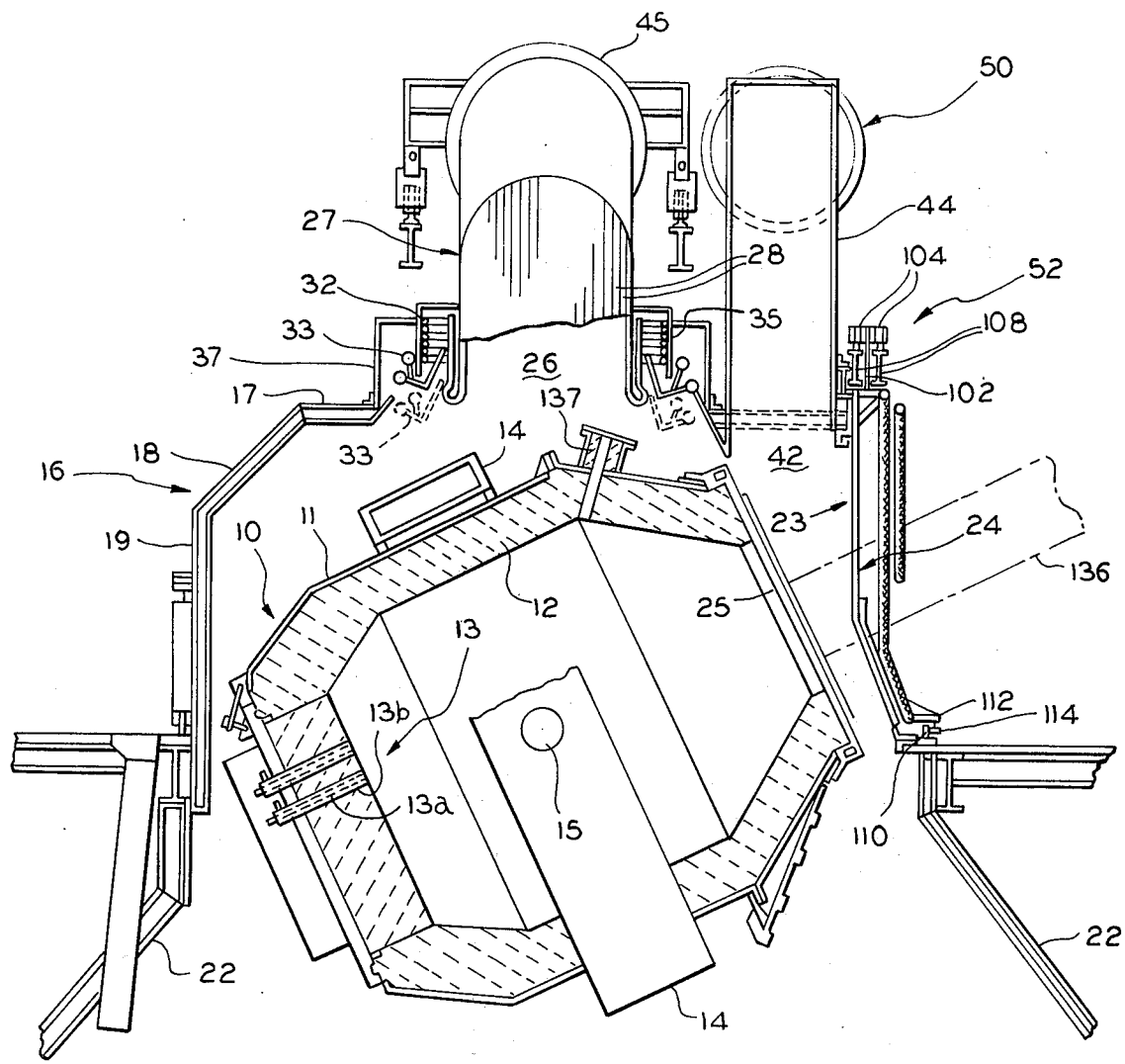
FIG. 1 is a side elevational view partly in section of a converter vessel and surrounding enclosure.

The invention will be illustrated and discussed with respect to a bottom blown converter vessel 10 shown in FIG. 1 although those skilled in the art will appreciate that it has application to other types of conversion vessels as well, such as basic oxygen and argon-oxygen systems.

The vessel 10 has an opening 25 at its upper end and includes a metallic shell 11 and refractory lining 12. A plurality of tuyeres 13 extends through the lower end of the vessel and includes an inner tuyere pipe 13a and an outer tuyere pipe 13b to permit the injection of oxygen and a hydrocarbon shielding fluid as will be discussed more fully below. Converter vessels of the type illustrated are generally supported in a conventional manner on a trunnion ring 14 which is fastened to the vessel 10 and has a trunnion pin 15 extending from each of its opposite sides. The trunnion pins 15 are suitably supported in a well-known manner on convenitonal bearing structures (not shown) and are coupled to a suitable drive mechanism (not shown) for tilting the vessel to each of a plurality of positions as may be required during a process cycle.

Figure 2:
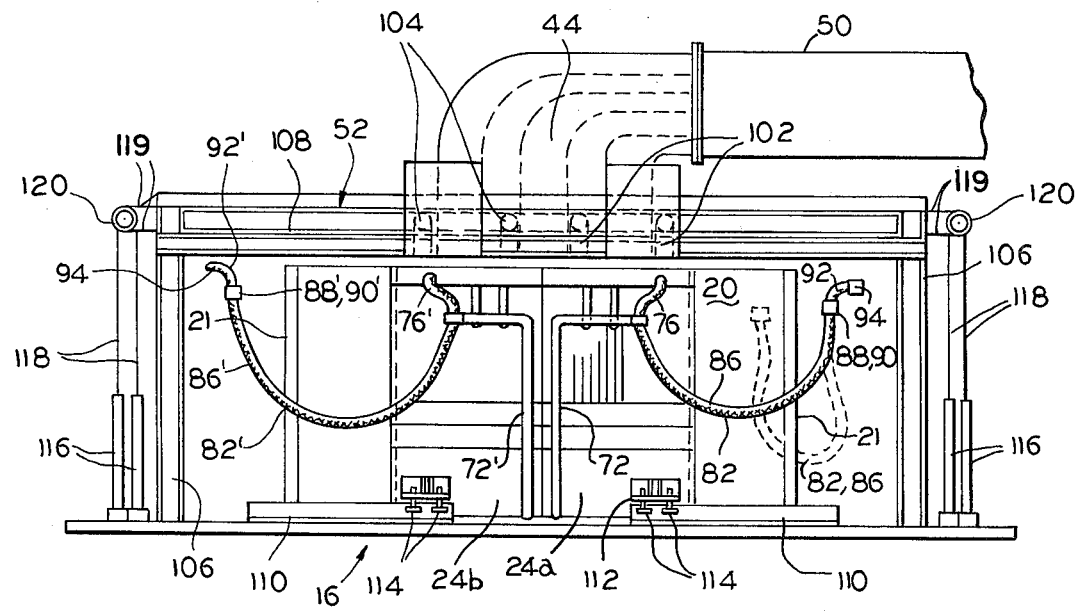
FIG. 2 is a front elevational view of the enclosure shown in FIG. 1.

The vessel 10 is shown in FIG. 1 to be disposed within a metallic enclosure 16 having a top wall 17 arranged above the upper end of the vessel and an inclined back wall portion 18 extending downwardly and outwardly from the top wall 17 and to the upper end of a vertical back wall portion 19. In addition, as seen in FIG. 2, the enclosure 16 includes a front wall 20 and generally vertical end walls 21. Extending downwardly and outwardly from the lower ends of the back and front walls 19 and 20 is a skirt portion 22. A generally rectangular opening 23 is formed in front wall 20 and to one side of and generally parallel to the axis of the trunnion pins 15. Mounted for movement into and out of a closed position relative to the opening 23 is a closure door assembly 24.

A top opening 26 is formed in top wall 17 for receiving a smoke hood 27 which is preferably water cooled and may be formed of a plurality of individual, longitudinally extending pipes 28 each connected to inlet and outlet manifolds (not shown). The passage of smoke hood 27 through opening 26 may also be water cooled by means of a helical pipe or pipes 32 which are also connected to inlet and outlet manifold pipes (not shown). A movable skirt 33 is disposed in surrounding relation to the lower end of the hood 27 and is movable by means (not shown) between its positions shown by full lines to its position shown by broken lines in FIG. 1. A first annular housing 35 surrounds pipes 32 and the upper portion of movable skirt 33 when the latter is in its elevated position. In addition, a second generally annular inverted housing 37 is affixed to the outer surface of housing 35 and to the cover 17 in surrounding relation to opening 26.

A second opening 42 is formed in cover 17 at a point above the access opening 23 for receiving the lower end of an auxiliary smoke hood 44. As those skilled in the art will appreciate, the primary smoke hood 27 is coupled by a conduit 45 to a gas cleaning system (not shown), but which may, for example, include a quencher (not shown), and a gas scrubber (not shown). The quencher and the gas scrubber may be of the variable throat venturi type of wet scrubbers which are well known in the art and which function to remove particulates and lower the off-gas temperature. In addition, means such as a fan (not shown) is coupled to the scrubber for creating a suction under the hood 27 and within the enclosure 16. For a more complete description of the gas cleaning apparatus which may be connected to the smoke hood 27, reference is made to copending application, Ser. No. 340,302, filed Mar. 12, 1973, now U.S. Pat. No. 3,908,969 and assigned to the assignee of the present invention. The auxiliary smoke hood is connected by a second conduit 50 and a valve (not shown) into the gas cleaning system between the quencher and gas scrubber.

The door assembly 24 may comprise two doors 24a and 24b which are mounted for generally horizontal movement away from each other on a support assembly 60. The doors 24a and 24b are identical and accordingly, only door 24a will be described in detail for the sake of brevity.

As seen in FIGS. 3, 4, and 5 door 24a comprises a watertube membrane consisting of a plurality of individual tubes 60 which are disposed in a parallel, spaced-apart relation. The tubes 60 are affixed to the edges of intermediate bars 62 in any suitable manner, such as by welding, to provide a gas-impervious member. Manifold pipes 64 and 66 are mounted generally horizontally at the upper and lower ends of door 24a and are respectively affixed to and are in communication with the adjacent ends of pipes 60. In order to provide clearance for the pivoting vessel as shown in FIG. 1, each of the pipes 60 and bars 62 are bent forwardly adjacent their lower portions.

Extending forwardly from and mounted on manifold 64 are a first pair of hangers 68 and 70 for supporting a water inlet pipe 72 connected to the left end of manifold pipe 66 as viewed in FIG. 3. A third bracket 74 is similarly affixed to manifold 64 for supporting a cooling-water outlet pipe 76 connected to upper manifold 64 adjacent the right end as viewed in FIG. 3. The details of the brackets 68, 70, and 74 form no part of the invention and accordingly will not be discussed in detail. It is sufficient for purposes of understanding the invention to note that each of the brackets includes a U-bolt 78 for engaging its supported cooling-water pipe.

Cooling water inlet pipe 72 extends upwardly from manifold 68 in general parallelism with pipes 60 to a point adjacent the upper end of door 24a and then extends horizontally in general parallelism with manifold 64, through the U-bolts 78 of bracket 68 and 70 downwardly into a first coupling 80. Connected to the lower end of coupling 80 is a flexible shielded hose 82. The outlet tube 76 is generally Z-shaped and is connected at its lower end to a coupling 84 to which a flexible hose 86 is also connected. The couplings 80 and 84 are conventional and consist of a pair of gasketed members on the end of each pipe and hose and which are attached by bolts extending through flanges.

The flexible hoses 82 and 86 extend generally laterally of door 24a and their opposite ends are connected to stationary couplings 88 and 90 which are suitably supported by means not shown adjacent to the front wall 20 of enclosure 16. Conduit 92 connects coupling 88 to a source of cooling water (not shown) and conduit 94 is connected to coupling 90 to provide a return path for cooling water from door 28a. The source may for example, comprise a heat exchanger or other apparatus which extracts heat from the cooling water delivered through pipe 94 prior to returning the same to the door through pipe 92. Flexible hoses 82', 86' similarly connect inlet and outlet pipes 72', 76' of door 24b to a cooling water source. Plates 95 and 95' mounted on doors 24a and 24b, respectively, protect hoses 82, 86, 82', and 86' from contact with said doors.

The hoses 82 and 86 are unsupported between the couplings 80, 84, and 88, 90 and are flexible to permit the connections to the door 24a to be maintained as the doors are moved between its open and closed positions as will be discussed more fully below. The hoses 82, 86 will flex during door movement as shown by full lines and broken lines in FIG. 2 and the hoses 82', 86' of door 24b will flex in a similar manner.

Referring again to FIG. 3, it will be noted that a first membrane 96 is disposed in manifold pipe 66 at a point approximately one-third of the length thereof from the left-end and a second diaphragm 98 is disposed in manifold 64 at a point approximately one-third of its length from the right-end. The diaphragms 96 and 98 extend across their respective manifold pipes and divide each into two isolated flow passages. As a result, the cooling water entering manifold pipe 66 from inlet pipe 72, will flow upwardly in all of the tubes 60 disposed to the left of diaphragm 96 and exit the upper ends of tubes 60 in manifold pipe 96. The cooling water will then flow downwardly through all of the tubes 60 located between diaphragms 96 and 98, exit the lower ends thereof into manifold pipe 66 to the right side of diaphragm 96, then flow upwardly through all of the tubes 60 located to the right of diaphragm 98 and from there pass toward the right and into outlet pipe 76.

It will be appreciated that while a specific cooling water flow pattern is achieved by arranging the diaphragms 96 and 98 in the manner indicated in FIG. 3, any suitable flow pattern can similarly be achieved by arrangement of one or more diaphragms in the manifolds 64 and 66.

As seen in FIGS. 3–5, a second pair of brackets are suitably affixed to the upper manifold pipe 64. Mounted on brackets 100 by bolts 101 are hanger members 102 which extend upwardly therefrom and carry rollers 104 at their upper ends. The support assembly 52 is shown in FIG. 2 to include a pair of vertical columns 106 whose upper ends are bridged by a pair of rails 108 upon which the rollers 104 are disposed.

A second pair of rails 110 are disposed in general alignment with it and extend respectively from a point adjacent the lower outside corners of doors 24a and 24b outwardly and away from the doors in general parallelism therewith and with rails 108. A roller assembly consisting of a bracket 112 and a roller 114 are mounted respectively at each of the lower outside corners of doors 24a and 24b for cooperative engagement with the rails 110. It would be appreciated that the doors 24a and 24b, respectively hang from the rails 108 and that the outwardly extending lower portions of the doors create a clockwise movement as viewed in FIG. 1 so that rollers 114 are urged to do positive engagement with the forward surface of the respective rails 110.

The details of the door support assembly and drive form no part of the present invention and will, therefore, not be described in detail. For a more complete description of a door support and drive assembly, reference is made to patent application Ser. No. 645,529, filed Dec. 31, 1975 and assigned the assignee of the present invention. For purposes of understanding the invention it will be sufficient to state the doors 24a and 24b may be moved between open and closed positions by means of reversible hydraulic motors 116; one of which is connected to each door by means of cables 118 which extend around drums 120 from which additional cables 119 extend to the hangers 102.

Figure 6:
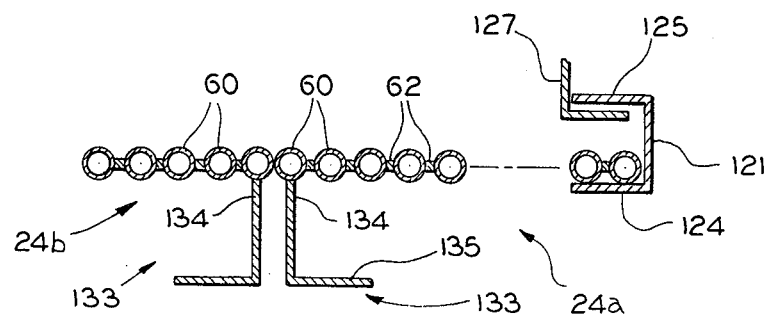
FIG. 6 is a view taken along lines 6—6 of FIG. 5 and showing the door sealing structure.

Each of the doors 24a and 24b are provided with peripheral seals to minimize the escape of pollutant gases from the enclosure 16. Specifically a first channel member 121 is affixed to the vertical portion of door 24a and a second channel number 122 which is affixed to the side of the obliquely extending lower end thereof. The channel members 121 and 122 are shown in FIG. 6 to be generally U-shaped in transverse cross-section with one leg 124 affixed to the end of the tubular membrane and the other end 125 being disposed in parallelism with an elongate L-shaped member 127 affixed to the front wall 20 adjacent the opening 23. A similar member 128 is suitable affixed to the enclosure 16 and adjacent the sides of opening 23 and is disposed adjacent to and in parallelism with member 122.

Extending along the rear of door 24a and adjacent its upper end is a horizontally extending L-shaped member 130 having an inwardly projecting leg 131 disposed in parallelism with leg 131 is one of the legs of a generally U-shaped channel member 132 which is suitably affixed to enclosure 16 and adjacent the upper end of opening 23.

At the adjacent edges of the doors 24a and 24b as viewed in FIG. 6, there is affixed a pair of elongate seal strips 133 which are generally L-shaped in transverse cross-section. One edge of a first leg 134 of each strip 133 is affixed to the endmost tube 60 of its associated door with the legs 134 extending in general parallelism to each other and normal to the doors. The other legs 135 of strips 133 extend generally normal to the legs 134 and are substantially coplanar. Although not seen in FIG. 6, it will be appreciated that the strips 133 follow the contour of the doors 24a and 24b and extend generally outwardly in parallelism with the lower ends of the doors as viewed in FIG. 1.

In operation of the apparatus illustrated in FIG. 1 and doors 24a and 24b will be opened to permit the passage of a charging chute 136 into the opened end 25 of the vessel. The skirt 33 will also be elevated to its position shown by full lines to permit the vessel 10 to rotate. Initially the vessel may be charged with hot metal or scrap during which time the two tuyeres 13 will be above the metal level so that inert gases such as nitrogen or argon or no gas may be delivered to the tuyeres 13. In either event, a valve (not shown) which couples the auxiliary hood to the gas cleaning system will be opened and a vent fan (not shown) operated to withdraw and secondary emissions which may evolve from the vessel.

After the vessel 10 has been charged, it will be rotated to a vertical position with its open upper end 25 positioned below skirt 33. During this time inert gases are delivered through the tuyeres 13 and the hydraulic motors 88 are operated to close the doors 24a and 24b. When the vessel 10 has assumed its upright position and the doors 24a and 24b have been closed, the main oxygen blow may commence with oxygen being delivered through the inner tuyere pipe 13a and the hydrocarbon shielding fluid delivered through the outer tuyere pipe 13b.

During the initial portion of the oxygen blow, the skirt 33 will remain in an elevated position so that air is drawn around its lower end and into the gas cleaning system conduits so as to oxidize combustible gases initially evolving from the vessel 10 so that an inert gas plug passes through the system. When stochiometric conditions have been achieved, the skirt 33 is lowered to its position shown by broken lines to minimize the intake of air whereby combustible gases such as hydrogen and carbon monoxide which evolve from the vessel may be collected safely. In the event it is necessary to charge the vessel 10 with additional hot metal or scrap or for sampling purposes, the skirt 33 is elevated, the valve (not shown) is opened to couple the auxiliary hood 44 to the gas cleaning system (not shown) and the hydraulic motors 88 operated to reopen the doors 24a and 24b. The vessel 10 may then be rotated to its position shown by full lines in FIG. 1. If additional gas treatment is required, the just descirbed operation is repeated. After the treatment cycle has been completed, the vessel 10 will be rotated counter-clockwise for discharging the meter therein from the top nozzle 137 into a molten metal ladle disposed below enclosure 16.

It will be appreciated that during the main oxygen blow, when the vessel is oriented in a vertical position and the skirt 33 is adjacent the open end 25, some gas may periodically escape at the small gap and therebetween. Additional gases will escape into enclosure 16 when the vessel is turned up or turned down. The seal strips 122 and 127 at the edges of the doors, 130 and 132 at the top of the doors and 133 at the inner edges of the doors will minimize the leakage of gases from the enclosure 10.

During the process cycle, the vessel 10 may also be disposed in its tilted position shown in FIG. 1 while the doors 24a and 24b are closed. During such times, radiant heat from the vessel and hot gases discharging from the open upper end 25 imposes a substantial head load on the doors 24a and 24b. The circulation of cooling water through the tubes 60 protects the doors 24a and 24b from deterioration due to the heat load.

Figure 7:
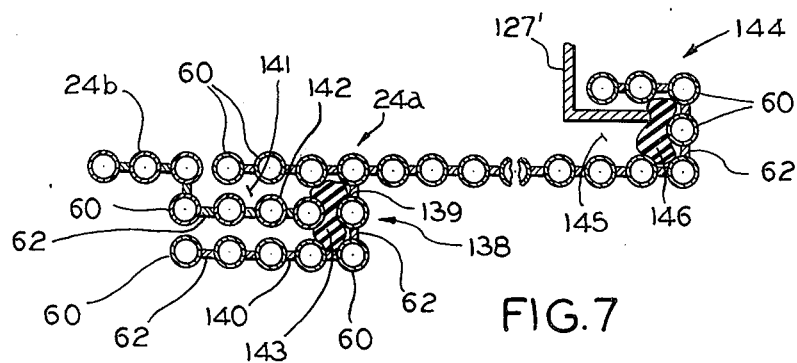
FIG. 7 illustrates an alternate form of the door sealing structure.

An alternate form of sealing around the edges of the doors 24a and 24b is shown in FIG. 7. Here, an L-shaped section 138 formed of tubes 60 and bars 62 extends the height of the door 24a and includes a first wall 139 affixed to and extending normally from door 24a adjacent its inner end and a second wall 140 extending from the end wall 138 and in general parallelism with door 24a to define a recess 141. Mounted at the end of door 24b and offset in the direction of recess 141 is a short wall section 142 formed of tubes 60 and bars 62. The section 141 is coextensive in height with section 138. It can be seen in FIG. 7 that the width of recess 142 is equal to two tube diameters and two bar widths while a wall section 141 is displaced from door 24a one tube diameter and one bar width. Accordingly, wall 142 extends substantially down the center of the recess 141. Disposed at the inner end of recess 141 and positioned to be engaged by the end of wall 138 is a seal formed at the high temperature resistant compressable material such as cerafelt.

At the opposite end of each of doors 24a and 24b in the embodiment of FIG. 7 is a generally L-shaped section 144 formed of tubes 60 and bars 62. Section 143 extends rearwardly and inwardly to define a gap 145 for receiving one edge of the strip 127' when the doors are in their closed position. A heat resistant compressable gasket 146 which may be identical to gasket 142 is disposed at the end of recess 144 for engagement by strip 127'. When the doors are in their closed position, shown in FIG. 7, a labyrinth seal is provided at each of the lateral edges which does not, however, interfere with door opening or closing. It will be appreciated that the various tubes 60 in sections 138 and 144 and the wall 142 will be connected to their respective manifold pipes at the upper and lower edges of the doors and will further be contoured in the manner similar to lower ends of each door.

Figure 8:
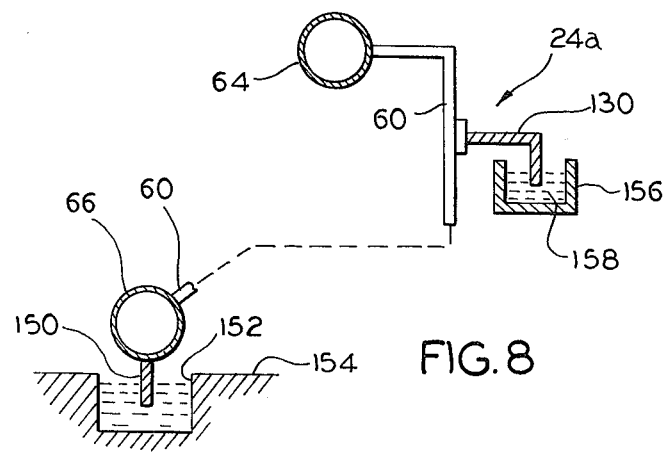
FIG. 8 illustrates a further alternate form of the door sealing structure.

A more positive seal at the upper and lower edges of the doors 24a and 24b is provided by an alternate embodiment of the sealing at these locations is shown in FIG. 8. Specifically, a fin 150 is affixed to the lower manifold pipe 66 and extends vertically and outwardly therefrom for being received in a trough 152 formed in the work floor 154. Disposed within the trough is water 156 which is under continuous circulation from inlet and outlet connections (not shown). The fin 150 extends below the level of water 156. Similarly, a U-shaped trough 158 is supported in parallelism with the strip 130 affixed to the rear of the respective doors 24a and 24b. The lower edge of the strip 130 extends below the level of water 158 in trough 156 which water is under continuous circulation from inlet and outlet pipes (not shown).

It will be appreciated that the water seals at the upper and lower periphery of each door 24a and 24b will provide a positive seal which does not impose any frictional drag on the respective doors.

Figure 10:
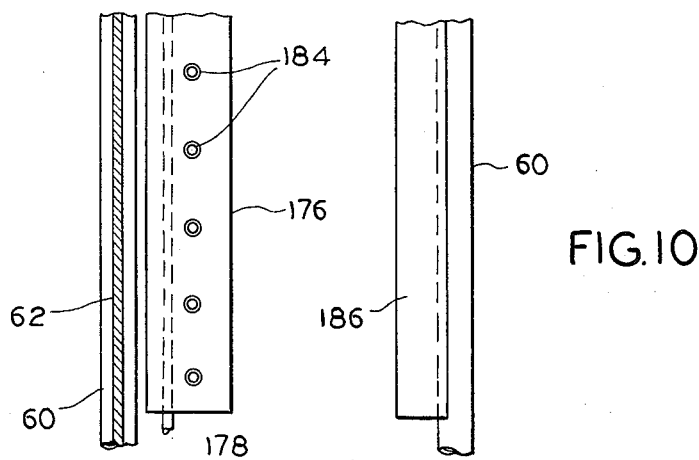
FIG. 10 is a view taken along lines 10—10 of FIG. 9.
Figure 9:
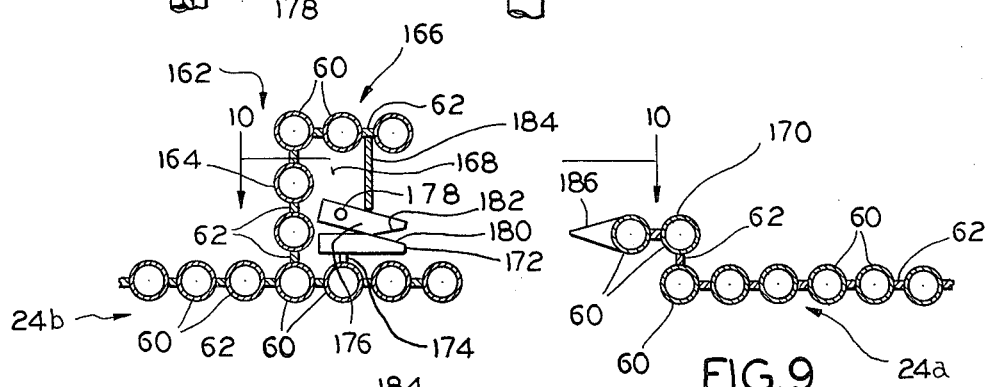
FIG. 9 illustrates a further embodiment of the door sealing structure.
Figure 11:
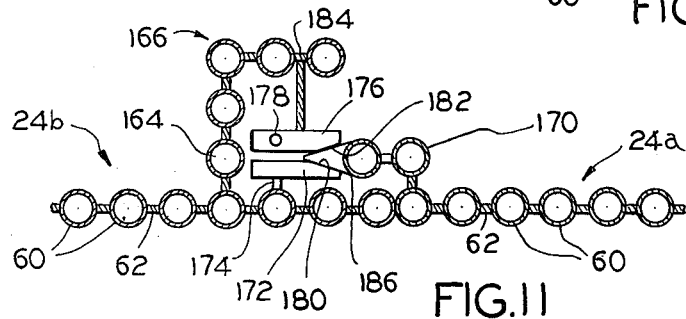
FIG. 11 illustrates the door sealing structure of FIG. 9 in its closed position.

An alternate form of sealing at the inner edges of the doors 24a and 24b is shown in FIGS. 9-11. Here, an L-shaped section 162 formed of tubes 60 and bars 62 extends the height of the door 24b and includes a first wall 164 affixed to and extending normally from door 24b adjacent its inner end and a second wall 166 extending from the end wall 164 and in general parallelism with door 24b to define a recess 168. Mounted at the end of door 24a and offset in the direction of recess 168 is a short wall section 170 formed of tubes 60 and a first bar 62. A second bar 62 joins wall section 170 in the endmost tube 60 of door 24a.

A first seal strip 172 is mounted by means of bar 174 to the tube 60 adjacent the tube to which the section 162 is attached. A second seal strip 176 is pivotively mounted adjacent strip 172 on a rod 178 which is affixed at its upper and lower ends to the manifold pipes 64 and 66. The sealing strips 172 and 176 thus are disposed within the gap 168 and extend in general parallelism with the door 24b. On the edge of each sealing strip 172 and 176 adjacent the edge of door 24b are inwardly facing oblique surfaces 180 and 182, respectively. A plurality of spaced apart, relatively short rods 184 are affixed to one of the bars 62 which define wall 166. The bars 184 extend generally horizontally where their free end engages the sealing strip 176 between the end having the oblique formed surface 182 and the rod 178.

A third sealing strip 186 is affixed to the end most tube 60 of section 170. Sealing strip 186 is generally triangular in transverse cross section and extends toward and is in general alignment with the surfaces 180 and 182.

Each of the sealing strips 172, 176 and 186 may extend for substantially the full height of doors 24a and 24b and are preferably contoured and in parallelism with the outwardly extending lower portion of the door. It will be appreciated, however, that to permit strip 176 to pivot as will be described below, a gap must be provided therein at the knee of the door bend. FIGS. 9 and 10 show the doors 24a and 24b in an open position. When the doors are moved to their closed positions shown in FIG. 11, the seal strip 186 will move into the gap between strips 172 and 176 with its side surfaces engaging the surfaces 180 and 182 thereof. As the strip 186 moves into its closed position, the strip 176 will pivot about rod 178 as the rods 184 prevent the strip 176 from moving laterally.

FIGS. 12 and 13 show an alternate form of door 24b which includes a removable section 190 removably securable in a gap 191 formed at the lower inside portion of the door which is the portion most heavily impacted by material discharging from the vessel as the same is tilted generally in its position shown in FIG. 1. Because section 190 will be subjected to substantially greater damage and wear than the remaining portions of the door, its removability feature allows replacement without the necessity for replacing an entire door. It will be appreciated also that the second door which is not shown in FIG. 12 will have a similar removable section correspondingly located or in other words adjacent the illustrated section 190.

Those portions of the door 24b which are similar to corresponding portions of door 24a shown in FIGS. 3 and 4 have been given like reference numerals. Specifically, door 24b includes an upper manifold pipe 70 which extends across its entire width and a plurality of water tubes 60 all of which are affixed to and open at their upper ends in manifold 70. However, the lower manifold 66 is approximately one-third of the length of the upper manifold 70 and only those pipes at the left hand one-third of the door 246 terminate in lower manifold pipe 66. A second manifold pipe 192 is disposed generally horizontally and in parallelism with manifold pipes 66 and 70 and is located just above the vertical elevation on door 24b prime where its lower end extends obliquely outwardly. Those water tubes 60 located at the right hand two-thirds of door 24b are shorter than the rest and terminate in and are affixed to manifold 192.

Door section 190 also includes an upper manifold pipe 194 and a lower manifold pipe 196 and a plurality of water tubes extending therebetween and being affixed thereto. The distance between the centerlines of manifold pipes 194 and 196 substantially equal to but slightly less than the distance between the centerlines of manifold pipes 192 and 66. In order that the width of the door 246 and the section 190 may have a width substantially equal to the length of the respective manifolds, the tubes at the edges are arranged in tandem adjacent the edges of the manifolds and are bent outwardly therefrom into alignment with the manifold ends. It will be appreciated that bars 62 will be disposed between and connected to the tubes 60 of door 24b and the removable section 190 to provide a panel which is substantially gas impervious.

A first elongate bracket 197 is affixed to the manifold pipe 192 and extends forwardly therefrom and for substantially its entire length. A similar bracket 198 is affixed to the manifold pipe 194 and also extends substantially for its entire length. Since the manifold pipe 192 and 194 are substantially equal in length, the brackets 197 and 198 are substantially coextensive. Disposed at the adjacent ends of manifolds 66 and 196 are brackets 199 and 200, respectively. When the section 190 is positioned in the gap 191 with manifold 194 below manifold 192 and manifold 196 coaxially aligned with manifold 66; the bracket 197 is parallel to and immediately above bracket 198 and bracket 199 is parallel to and immediately above bracket 200. The brackets 197, 198 and 199, 200 may be secured in any suitable manner such as by means of bolts (not shown) which extend through aligned openings (not shown) formed in each pair of brackets. In this manner the section 190 may be removably affixed to the door 24b'.

A first partition 201 is disposed and the upper manifold 70 and at a distance from its right end which is approximately one-third its length. In addition, a second partition 202 is disposed in manifold 196 and at a point substantially intermediate ends. The partitions 201 and 202 extend across their respective manifold pipes and divide the same into separate flow passages. A cooling fluid inlet pipe 203 is connected to the manifold pipe 66 and the cooling liquid outlet pipe 204 is connected to manifold pipe 70 on the right-hand side of partition 178 as viewed in FIG. 12. A coupling 206 on the lower end of the pipe 204 is connected to a mating coupling 208 disposed on the upper end of a pipe 210 which is connected at its lower end to the manifold 196 on the right-hand side of partition 202. A second pipe 212 is connected to manifold 196 on the opposite side of partition 202 and extends upwardly therefrom where a coupling 214 at its upper end is connected to a mating coupling 216 of the cooling liquid discharge pipe 218 which extends laterally from door 24b.

The pipes 210 and 212 are suitably affixed intermediate their ends to manifold pipe 194 by means of brackets 220 and U-bolts 224 and the inlet and outlet pipes 203 and 218 are suitable mounted on the door by means of brackets 226 and bolts 228. After the panel 190 has been affixed in position on door 24b' as hereinabove described, the couplings 206, 208 and 214, 216 are suitably coupled to complete the fluid flow connections between door 24b and section 190.

It will be appreciated that after door section 190 has been fixed in position on door 24b' and various coupling connections made, the fluid flow circuit through the combined door will be complete. More specifically, cooling water provided to inlet pipe 203 will flow from manifold pipe 66' upwardly through tubes 60 to manifold pipe 70; downwardly through the tubes 60 connected to manifold pipe 70 on the left of partition 201 downwardly to manifold 192; upwardly to manifold 70 through tubes 60 connected to manifold 70 on the right-hand side of the partition 202; downwardly through pipes 204 and 208 to manifold 196; upwardly through pipes 60 on the right side of partition 202 to the manifold 194; downwardly through pipes 60 on the left side of partition 202 to manifold 196; and finally upwardly therefrom through pipes 204 and 218 for return flow to the cooling water source. It can be seen therefore, that the cooling water will flow through each of the tubes 60 in the door 24b and in the removable section 190. In the event the section 190 should become damaged or worn by the gases and material discharging vessel 10, the same may be detached from door 24b by loosening the bolts which join the flanges 197, 198 and 199, 200. A new panel section 190 may then be affixed to door 24b in a similar manner. It can thus be seen, that the portion of the door which is subject to the severe heat loading and material discharge from the vessel can be replaced so that the remaining portions of the door may be used for longer periods without replacement.

Figure 14:
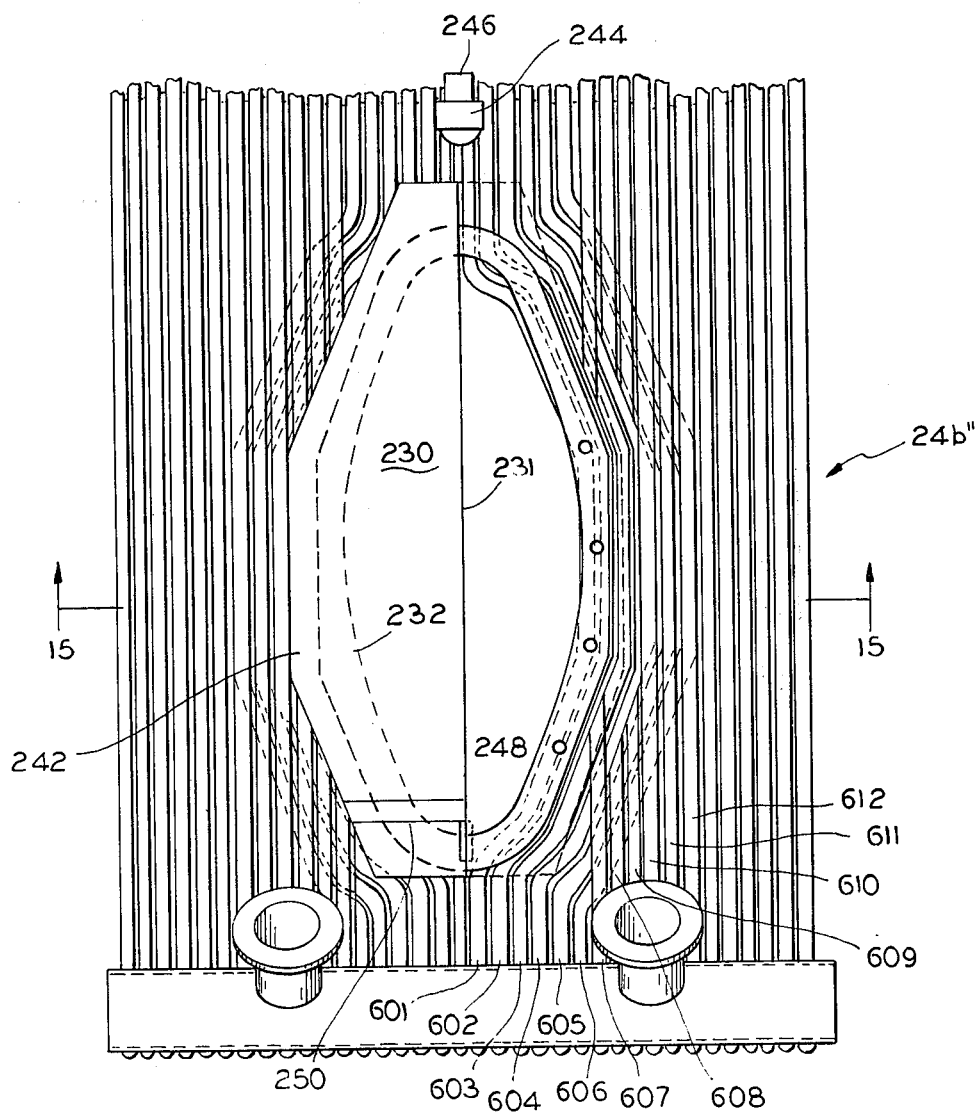
FIG. 14 is a front elevational view of a modified form of the access door.

FIG. 14 shows a modified form of the invention wherein a sampling aperture 230 is formed in the door 24b'' to permit a sampling or temperature measuring probe to be inserted into enclosure 16 without opening the doors. Aperture 230 is formed by bending groups of pipes 60 backwardly away from the vertical center line 231 of aperture 230 and behind adjacent tubes. For example, the first 12 tubes from the vertical center line of aperture 230 are numbered 601-612. Of these, tubes 601, 602, 607 and 608 are bent outwardly but remain in substantially the same vertical plane. Tubes 609 and 610 are bent backwardly behind tubes 607 and 608; tubes 605 and 606 are bent outwardly and backwardly behind tubes 611 and 612 which are straight and tubes 603 and 604 are bent outwardly and backwardly behind tubes 605 and 606. A collar 232 is affixed to tubes 601 and 602 and the corresponding tubes on the opposite sides of aperture 230 thereby to surround and define the aperture.

Figures 16, 17:
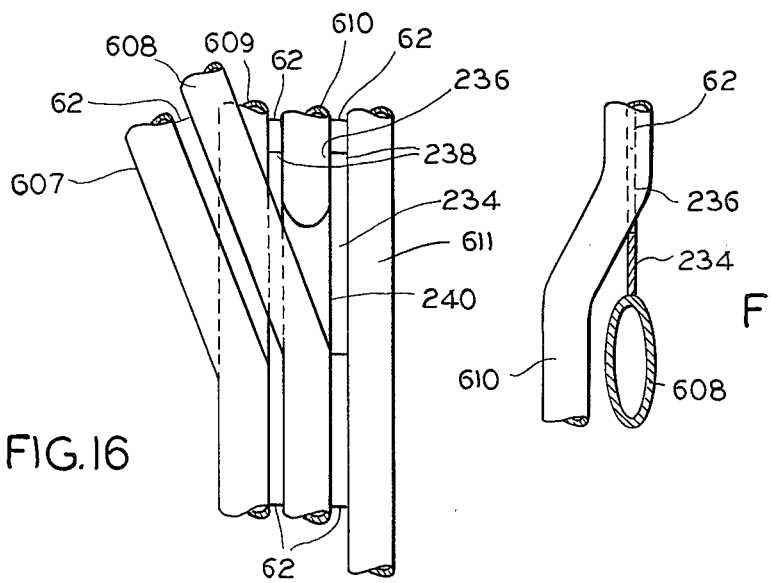
FIG. 16 is a fragmentary view of a portion of the door shown in FIG. 14.
FIG. 17 is a view taken along lines 17—17 of FIG. 16.
Figure 15:
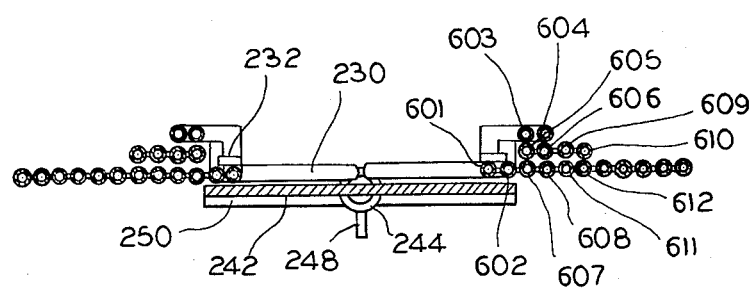
FIG. 15 is a view taken along lines 15—15 of FIG. 14.

It will be appreciated that bars 62 will be provided between each of the tubes of door 24b'' to provide a substantially gas impervious panel. However, in those sections where the tubes are bent forwardly or backwardly, it is necessary to provide additional inserts. This is illustrated, for example, in FIGS. 15 and 16 which shows in greater detail one section of pipes 607-611. At the particular point of illustration, pipes 607, 608 and 611 are in substantially the same plane, with pipes 607 and 608 bent obliquely to the left. In this section also, the portions of pipes 609 and 610 are disposed behind the pipes 607 and 608. At the point where pipe 608 diverges away from pipe 611, pipe 610 is bent forwardly so that from that point upwardly, its axis lies in substantially the same plane as pipe 610. In the gap between pipes 608, 610 and 611, a generally V-shaped insert 234 is provided. Insert 234 is disposed generally in the plane defined by the axes of pipes 608 and 611 and has an oval cutout 236 at its upper end which embraces pipe 610 at the point of its upward bend. The upper arms 238 of insert 234 are substantially equal in width and thickness to bars 62 and form a continuation thereof. The lower portion 240 of insert 236 fills the generally triangular gap between pipes 608, 610 and 611 with its lower end being substantially equal in width and thickness to the abutting bar 62. Those skilled in the art will appreciate that similar insert members will be provided at the points of convergence and divergence of the tubes door 24b' although the same have not been illustrated in detail for the sake of brevity.

In order to substantially close the aperture 230 when sampling and measuring is not taking place, a door 242 may be provided with a door 242 having the same general configuration but slightly larger than the collar 232. Door 242 is supported at its upper end by a universal joint 244 which is mounted on the door 24b' by means of a bracket 246. A hook 248 may be provided at the lower end of the door to permit the same to be swung away from aperture 230 during sampling and measuring operations. A weight 250 may be provided on the outside lower end of the door so as to bias the same toward aperture 230.

While the aperture 232 is shown in FIG. 14 to be formed in one of the doors, it may also be formed at the center line between the two doors. In the latter case, the pipes defining the margin of the aperture are bent inwardly from the inner edge.

While only a few embodiments of the invention have been illustrated and described, it is not intended to be limited thereby but only by the scope of the claims.

I claim:

1. A converter vessel having a metal receiving opening formed adjacent an upper end,
    an enclosure having an upper wall portion disposed above said vessel and side wall portions extending downwardly along the sides of said vessel,
    an access opening formed in one of said wall portions, door means mounted adjacent said access opening for movement into open and closed positions relative to said access opening,
    said vessel being mounted for pivotal movement toward and away from the access opening to position said vessel opening adjacent said door means whereby hot gases discharging said vessel will be directed toward said door means,
    said door means including support means,
    at least a substantial portion of said door means being defined by a plurality of elongate, generally parallel tubular heat exchange members defining adjacent cooling fluid flow passages, connecting means joining said heat exchange members in a side-by-side relation and forming therewith a gas impervious panel, first and second manifold means extending along spaced apart portions of said door means, said tubular members being connected at their opposite ends to said manifold means, cooling fluid inlet and outlet means connected to spaced apart locations of said manifold means, and means for directing the flow of cooling fluid through said tubular members and between said manifold means said manifold means each comprising an elongate tubular member, and flow diverting means disposed in each of said manifold means for dividing the same into at least a pair of flow passages whereby said cooling fluid is forced to flow upwardly in a first plurality of said tubular members and downwardly in a second plurality of said members.

2. The combination set forth in claim 1 and including first baffle means mounted on at least one edge of said door means and second baffle means mounted on the adjacent periphery of said enclosure adjacent said access opening, said first and second baffle means being disposed in a closely adjacent relation when said door means is in its closed position to minimize the flow of gases around the periphery of said door means.

3. The combination set forth in claim 2 wherein said door means comprises a pair of doors moveable in opposite directions between open and closed positions relative to said access opening, said first baffle means includes strip means mounted along the vertical adjacent edges of each of said doors.

4. The combination set forth in claim 3 wherein the strip means mounted on the adjacent edges of said doors comprises a first generally L-shaped section formed of said tubular members and said connecting means and mounted along the adjacent edge of one of said doors to define a gap with the end of said one door and a second section mounted on the other of said doors and formed of said tubular members and said connecting means and extending into said gap.

5. The combination set forth in claim 4 and including an elongate gasket means mounted in said gap and adapted to be engaged by said second section when said doors are closed.

6. A converter vessel having a metal receiving opening formed adjacent an upper end,
    an enclosure having an upper wall portion disposed above said vessel and side wall portions extending downwardly along the sides of said vessel,
    an access opening formed in one of said wall portions, door means mounted adjacent said access opening for movement into open and closed positions relative to said access opening,
    said vessel being mounted for pivotal movement toward and away from the access opening to position said vessel opening adjacent said door means whereby hot gases discharging said vessel will be directed toward said door means,
    said door means including support means,
    at least a substantial portion of said door means being defined by a plurality of elongate, generally parallel tubular heat exchange members defining adjacent cooling fluid flow passages, connecting means joining said heat exchange members in a side-by-side relation and forming therewith a gas impervious panel, first and second manifold means extending along spaced apart portions of said door means, said tubular members being connected at their opposite ends to said manifold means, cooling fluid inlet and outlet means connected to spaced apart locations of said manifold means, and means for directing the flow of cooling fluid through said tubular members and between said manifold means, said tubular members extend from the lower to the upper end of the said door means, said first manifold means is disposed at the lower end of said door means and said second manifold is disposed at the upper end of said door means, a first flexible hose means connected at one end to said cooling fluid inlet means and a second flexible hose means connected at one end of said cooling fluid outlet means, the opposite ends of said flexible hose means being connected to coupling means mounted adjacent said door means whereby said cooling fluid connections may be maintained as said door means moves between open and closed positions, said manifold means each comprises an elongate tubular member, and flow diverting means disposed in each of said manifold means for dividing the same into at least a pair of flow pasages, whereby said cooling fluid is forced to flow upwardly in a first plurality of said tubular members and downwardly in a second plurality of said members.

7. The combination set forth in claim 6 and including first baffle means mounted on at least one edge of said door means and second baffle means mounted on the adjacent periphery of said enclosure adjacent said access opening, said first and second baffle means being disposed in a closely adjacent relation when said door means is in its closed position to minimize the flow of gases around the periphery of said door means.

8. The combination set forth in claim 7 wherein said door means comprises a pair of doors moveable in opposite directions between open and closed positions relative to said access opening, said first baffle means includes strip means mounted along the vertical adjacent edges of said doors.

9. The combination set forth in claim 8 and including a first fin means mounted along the lower edge of said doors and a second fin means mounted adjacent the upper edge of said doors, first and second trough means disposed below said first and second fin means respectively, each of said trough means extending in a direction parallel to the direction of movement of said doors as the same move between their open and closed positions, said trough means being constructed and arranged for receiving a liquid, said fin means extending below the expected water level and its associated trough means to define liquid seals adjacent the upper and lower peripheries of said doors.

10. The combination set forth in claim 9 wherein the strip means mounted on the adjacent edges of said doors comprises a first generally L-shaped section formed of said tubular members and said connecting means and mounted along the adjacent edge of one of said doors to define a gap with the end of said one door and a second section mounted on the other of said doors and formed of said tubular members and said connecting means and extending into said gap.

11. The combination set forth in claim 10 and including an elongate gasket means mounted in said gap and adapted to be engaged by said second section when said doors are closed.

12. A converter vessel having a metal receiving opening formed adjacent an upper end,
an enclosure having an upper wall portion disposed above said vessel and side wall portions extending downwardly along the sides of said vessel,
an access opening formed in one of said wall portions, door means mounted adjacent said access opening for movement into open and closed positions relative to said access opening,
said vessel being mounted for pivotal movement toward and away from the access opening,
said door means including support means, a first plurality of tubular members extending from an upper region of said door means to a lower region thereof, first and second manifold means extending along the edges of said upper and lower regions, respectively, said tubular members being connected at their opposite ends to said first and second manifold means,
third manifold means disposed intermediate the edges of said upper and lower regions,
a second plurality of tubular members extending between said third manifold means and one of said first and second manifold means and being shorter than said first plurality of tubular members,
fourth and fifth manifold means,
a third plurality of tubular members extending between said fourth and fifth manifold means,
means for securing said fourth manifold means adjacent said third manifold means and said fifth manifold means adjacent the other one of said first and second manifold means,
said third plurality of tubular members being substantially equal in length to the difference in length between said first and second members means,
and cooling fluid inlet and outlet means, respectively, connected to at least one of said manifold means.

13. The combination set forth in claim 12 wherein said manifold means each comprises an elongate tubular member, and flow diverting means disposed in the one of said first and second manifold means and one of said fourth and fifth manifold means for dividing each into at least a pair of flow passages whereby said cooling fluid is forced to flow upwardly in a some plurality of said tubular members and downwardly in others.

14. The combination set forth in claim 13 and including a first pipe interconnecting the one of said first and second manifold means to the one of said fourth and fifth manifold means, a second pipe connecting one of said inlet and outlet to the others of said first and second manifold means and the other of said inlet and outlet to the others of said fourth and fifth manifold means.

15. The combination set forth in claim 14, wherein said tubular members are arranged in a spaced apart parallel relation, and elongate means is disposed between adjacent tubular members, said tubular members being affixed to said elongate means, wherein said tubular members and elongate means define a substantially gas impervious panel.

* * * * *